US009982693B2

(12) United States Patent
Nord et al.

(10) Patent No.: US 9,982,693 B2
(45) Date of Patent: May 29, 2018

(54) PIPELINE SYSTEMS AND METHODS

(71) Applicant: NG1 TECHNOLOGIES, LLC, Sarasota, FL (US)

(72) Inventors: Dustin P. Nord, Sarasota, FL (US); Cynthia L. O'Donnell, Sarasota, FL (US)

(73) Assignee: NGI Technologies, LLC, Sarasota, FL (US)

( * ) Notice: Subject to any disclaimer, the term of this patent is extended or adjusted under 35 U.S.C. 154(b) by 223 days.

(21) Appl. No.: 14/397,992

(22) PCT Filed: Sep. 21, 2013

(86) PCT No.: PCT/US2013/061093
§ 371 (c)(1),
(2) Date: Oct. 30, 2014

(87) PCT Pub. No.: WO2014/047527
PCT Pub. Date: Mar. 27, 2014

(65) Prior Publication Data
US 2016/0252113 A1  Sep. 1, 2016

Related U.S. Application Data

(60) Provisional application No. 61/704,206, filed on Sep. 21, 2012.

(51) Int. Cl.
*F15D 1/02*  (2006.01)
*F15D 1/00*  (2006.01)
(Continued)

(52) U.S. Cl.
CPC ......... *F15D 1/009* (2013.01); *B01D 17/0217* (2013.01); *B01D 19/0057* (2013.01); 
(Continued)

(58) Field of Classification Search
CPC ...................................................... F15D 1/009
(Continued)

(56) References Cited

U.S. PATENT DOCUMENTS 1,324,714 A * 12/1919 Allen .................... B21C 37/122
                                                    122/367.2
2,841,235 A *  7/1958 Curioni .................... F01N 1/12
                                                    181/280
(Continued)

FOREIGN PATENT DOCUMENTS

EP       1 604 122 A1   12/2005
JP     2009 204166 A     9/2009
(Continued)

OTHER PUBLICATIONS

EP extendedSearch Report, dated May 17, 2016.

*Primary Examiner* — James Hook
(74) *Attorney, Agent, or Firm* — Arendt & Associates Intellectual Property Group; Jacqueline M. Arendt

(57) ABSTRACT

The present invention relates to a method and a device comprising a self-regulating pressure pipe for increasing a rate of a fluid flow of a fluid and configured to respond to the volume of the fluid or the viscosity of the fluid by decreasing or increasing the pressure within the self-regulating pressure pipe.

21 Claims, 15 Drawing Sheets

(51) Int. Cl.
| | |
|---|---|
| *F16L 9/00* | (2006.01) |
| *F16L 55/027* | (2006.01) |
| *B01D 17/02* | (2006.01) |
| *B01D 21/00* | (2006.01) |
| *B01D 21/26* | (2006.01) |
| *F17D 1/20* | (2006.01) |
| *B01D 19/00* | (2006.01) |

(52) U.S. Cl.
CPC ....... *B01D 21/0045* (2013.01); *B01D 21/265* (2013.01); *F15D 1/02* (2013.01); *F15D 1/025* (2013.01); *F16L 9/006* (2013.01); *F16L 55/02772* (2013.01); *F17D 1/20* (2013.01)

(58) Field of Classification Search
USPC ...................................................... 138/38, 39
See application file for complete search history.

(56) References Cited

U.S. PATENT DOCUMENTS

| | | | | |
|---|---|---|---|---|
| 3,235,003 | A * | 2/1966 | Smith | F01N 1/125 138/38 |
| 3,508,398 | A * | 4/1970 | Zwick | F02C 5/10 60/39.77 |
| 4,747,697 | A | 5/1988 | Kojima | 336/339 |
| 5,058,704 | A | 10/1991 | Yu | 181/262 |
| 5,992,465 | A | 11/1999 | Jansen | |
| 6,382,317 | B1 | 5/2002 | Cobb | 166/265 |
| 6,533,030 | B2 | 3/2003 | Mitrovic et al. | 165/184 |
| 6,688,378 | B2 | 2/2004 | O'Donnell et al. | 165/109.1 |
| 6,997,214 | B2 | 2/2006 | Kuo | 138/39 |
| 7,140,394 | B2 * | 11/2006 | Eveleigh | G05D 23/1346 138/39 |
| 7,160,024 | B2 | 1/2007 | Dougherty et al. | 366/336 |
| 7,267,166 | B2 * | 9/2007 | Leterrible | F28F 1/40 138/38 |
| 7,665,442 | B1 * | 2/2010 | Levitz | F02M 29/06 123/184.21 |
| 8,015,794 | B2 | 9/2011 | Winkler et al. | 60/204 |
| 8,110,267 | B2 * | 2/2012 | Houston | A61F 2/06 138/118 |
| 8,234,859 | B2 | 8/2012 | Shirra | 60/312 |
| 2006/0005892 | A1 * | 1/2006 | Kuo | F15D 1/02 138/37 |
| 2008/0060712 | A1 * | 3/2008 | Gluzman | B01F 5/0617 138/39 |
| 2008/0314679 | A1 | 12/2008 | Rowe et al. | 181/241 |
| 2009/0065431 | A1 | 3/2009 | Bakke et al. | |
| 2009/0308472 | A1 | 12/2009 | Harman | 137/808 |
| 2011/0308236 | A1 | 12/2011 | Raasch et al. | 60/317 |
| 2012/0098264 | A1 | 4/2012 | Ganichot | 290/52 |

FOREIGN PATENT DOCUMENTS

| | | | | |
|---|---|---|---|---|
| WO | WO 2001/014782 | | 3/2001 | ............. F16L 55/00 |
| WO | WO 2008/072087 A2 | | 6/2008 | |

* cited by examiner

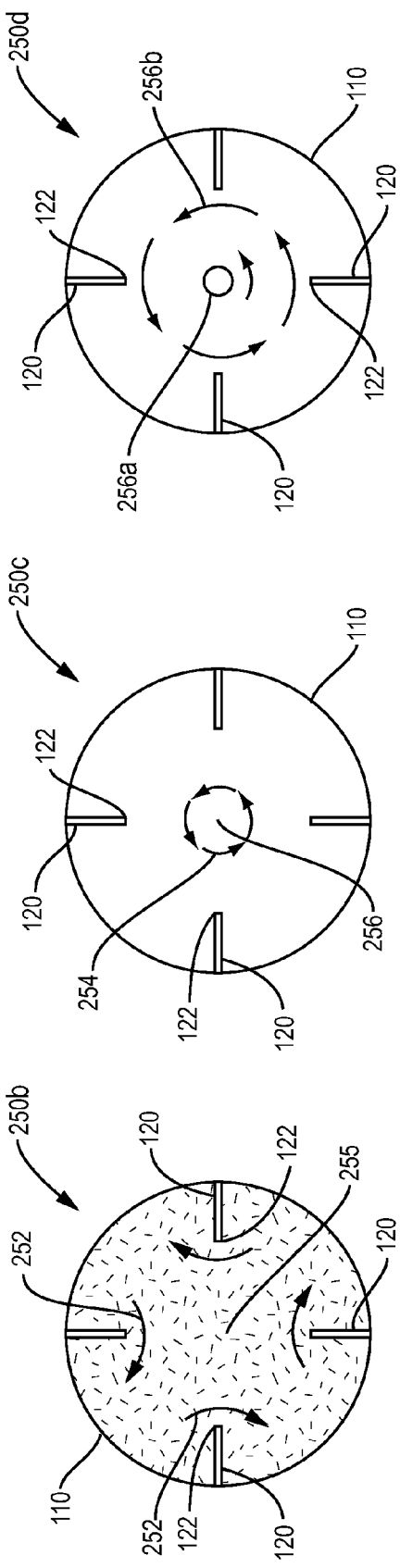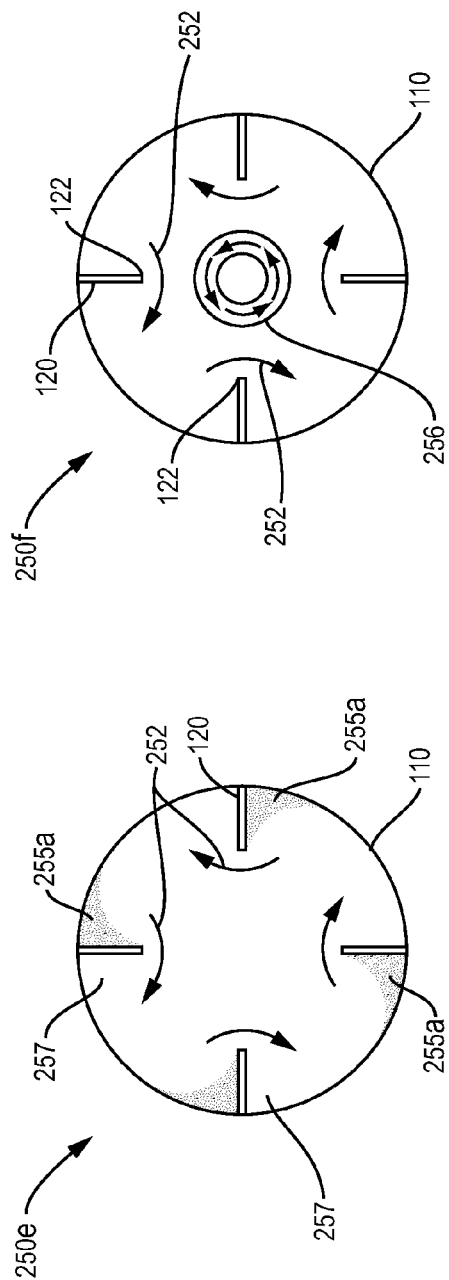

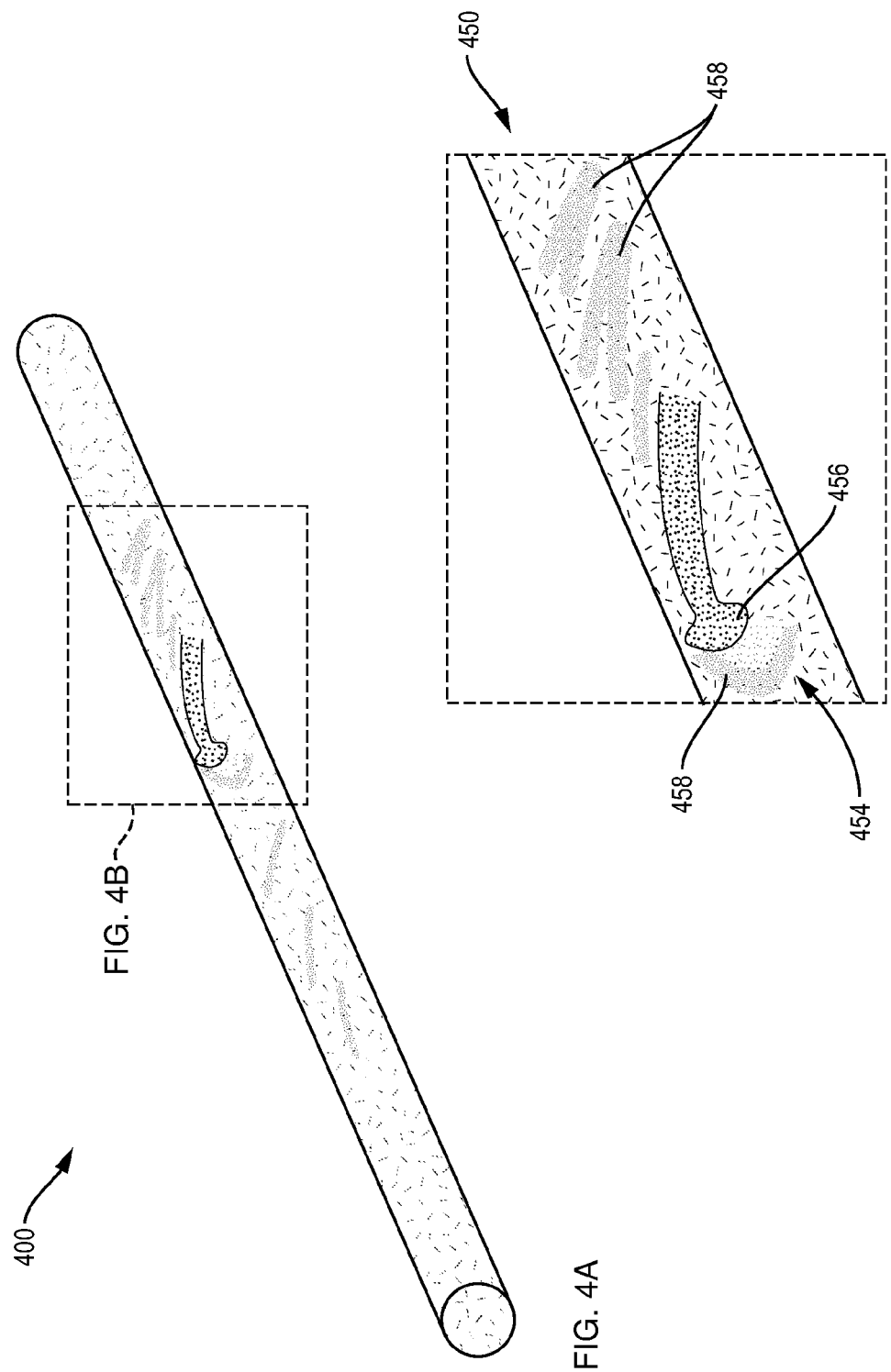

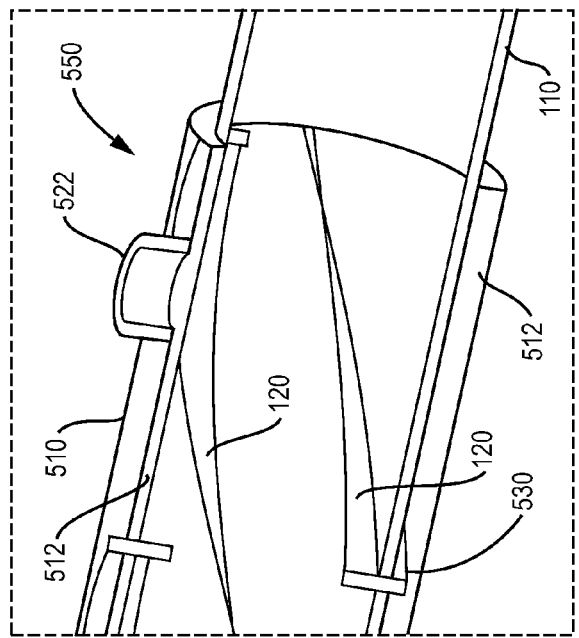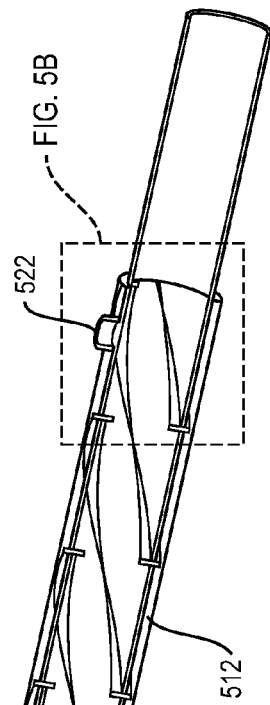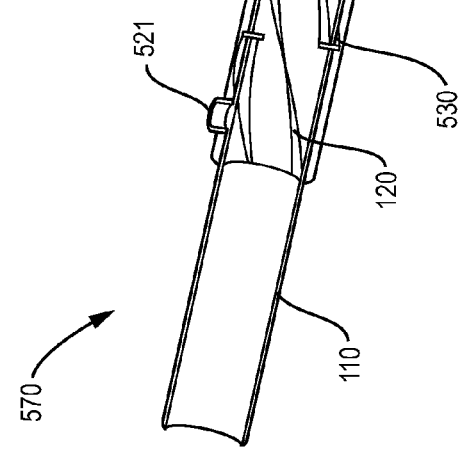
FIG. 5B
FIG. 5C

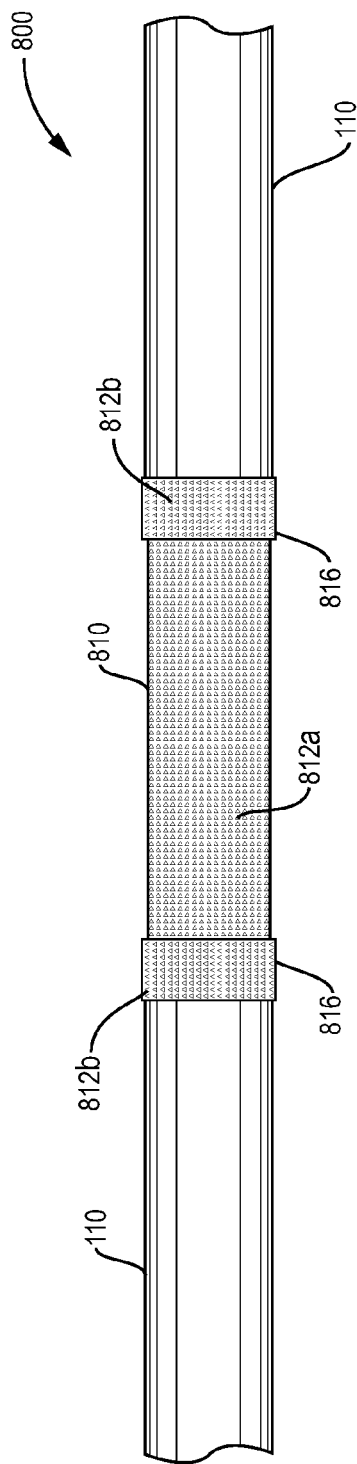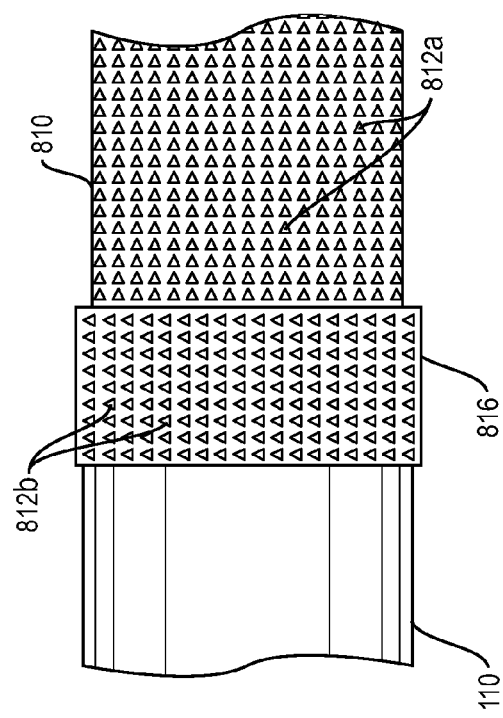
FIG. 8A
FIG. 8B

PIPELINE SYSTEMS AND METHODS

This application claims the benefit of U.S. Provisional Application No. 61/704,206 filed on 21 Sep. 2012, the teachings of which are incorporated herein by reference in their entirety.

BACKGROUND OF THE INVENTION

Pipeline systems can transport many different types of fluids, including, for example, crude oil, refined oil, natural gas, water, over great distances. Several thousands of miles of oil and gasoline pipelines crisscross the United States, connecting oil wells to ports, to refineries, and major distribution points.

Friction against the pipe wall slows down the rate of a liquid flowing through a pipeline, and therefore, pumping stations are needed to boost the pressure of the liquid. There is a well-recognized need for a system and method that reduces the level of this friction and speeds the flow of a liquid such as oil through a pipeline.

In relation to the environment, there is also a need for improved systems and methods for cleaning up oil spills that pollute bodies of water. Another environmental concern is the need for improving the efficiency of both hydroelectric power and steam turbines.

SUMMARY OF THE INVENTION

The invention inter alia includes the following, alone or in combination. One embodiment of the invention is a self-regulating pressure pipe for increasing a rate of a fluid flow of a fluid and configured to respond to the volume of the fluid or the viscosity of the fluid by decreasing or increasing the pressure within the self-regulating pressure pipe, the pipe having a cylindrical inner wall forming an axially positioned central passageway having an upstream portion and a downstream portion for the fluid flow through the central passageway, the self-regulating pressure pipe comprising: a first plurality of spaced, arcuate vanes of substantially constant width disposed within the pipe and having a first end and a second end, the first end fixedly attached to the inner wall of the self-regulating pressure pipe, and the second end free and spaced inwardly from the first end, the arcuate vanes projecting inwardly from the interior wall and formed into a first helical spiral, the curvature of the arcuate vanes being substantially the same as the curvature of the inner wall, the arcuate vanes configured to impart a swirling tangential component to the fluid flow such that a vortex having a low pressure bore forms in the center of the central passageway, thereby increasing an axial velocity of the fluid flow as the fluid moves through the bore of the central passageway from the upstream portion to the downstream portion, with the proviso that there is no component that impedes or restricts the fluid flow through the central passageway, the low pressure bore having the capability of expanding or contracting in response to the volume of fluid or the viscosity of the fluid flowing through the central passageway, thereby decreasing or increasing the pressure within the self-regulating pressure pipe.

Another embodiment of the invention is a method of transporting a fluid comprising: providing a self-regulating pressure pipe for increasing a rate of a fluid flow of a fluid and configured to respond to the volume of the fluid or the viscosity of the fluid by decreasing or increasing the pressure within the self-regulating pressure pipe, the pipe having a cylindrical inner wall forming an axially positioned central passageway having an upstream portion and a downstream portion for the fluid flow through the central passageway, the self-regulating pressure pipe comprising: a first plurality of spaced, arcuate vanes of substantially constant width disposed within the pipe and having a first end and a second end, the first end fixedly attached to the inner wall of the self-regulating pressure pipe, and the second end free and spaced inwardly from the first end, the arcuate vanes projecting inwardly from the interior wall and formed into a first helical spiral, the curvature of the arcuate vanes being substantially the same as the curvature of the inner wall, the arcuate vanes configured to impart a swirling tangential component to the fluid flow such that a vortex having a low pressure bore forms in the center of the central passageway, thereby increasing an axial velocity of the fluid flow as the fluid moves through the bore of the central passageway from the upstream portion to the downstream portion, with the proviso that there is no component that impedes or restricts the fluid flow through the central passageway, the low pressure bore having the capability of expanding or contracting in response to the volume of fluid or the viscosity of the fluid flowing through the central passageway, thereby decreasing or increasing the pressure within the self-regulating pressure pipe; adding or injecting the fluid into the upstream portion of the central passageway; and, allowing the fluid to flow through the central passageway, forming a vortex having a low pressure bore in the center of the central passageway, thereby increasing an axial velocity of the fluid flow as the fluid moves through the bore of the central passageway from the upstream portion to the downstream portion, thereby increasing the axial velocity of the fluid and transporting the fluid through the self-regulating pressure pipe.

BRIEF DESCRIPTION OF THE DRAWINGS

The foregoing and other objects, features and advantages of the invention will be apparent from the following more particular description of illustrative embodiments of the invention, as illustrated in the accompanying drawings in which like reference characters refer to the same parts throughout the different views. The drawings are not necessarily to scale, emphasis instead being placed upon illustrating the principles of the invention.

FIG. 2B is a schematic representation of a cross-sectional view of a pipe according to an embodiment of the invention and depicts each of four free vane edges associated with an arrow showing the direction of movement of a fluid over the vanes.

FIG. 2C is a schematic representation of the induction of a spiral motion to the fluid mass in the center of the pipe as shown in FIG. 2B by the movement of the fluid over the vanes as shown in FIG. 2B.

FIG. 2D is a schematic representation of the self-regulating pressure effect of the central bore according to an embodiment of the invention.

FIG. 2E is a schematic representation of the pipe and fluid movement as shown in FIG. 2B, with the addition of dots to represent a greater concentration of fluid on one side of each vane, according to an embodiment of the invention.

FIG. 2F is a schematic representation of the pipe and fluid movement as shown in FIGS. 2B, and 2E with the addition of a rotating fluid mass shown in the central bore according to an embodiment of the invention.

FIG. 4A is a representation of fluid flow velocity vectors of the fluid flow in a vaned pipe according to an embodiment of the invention.

FIG. 4B is an enlargement of a section of pipe shown in FIG. 4A.

FIG. 5B is a sectional view of a portion of the pipe shown in FIG. 5A.

FIG. 5C is a sectional view of a larger portion of the pipe depicted in FIG. 5B.

FIG. 8A shows a partial construction of the vaned pipe depicted in FIG. 7 according to an embodiment of the invention.

FIG. 8B is an enlarged view of a section of the pipe shown in FIG. 8A.

DETAILED DESCRIPTION OF THE INVENTION

Figure 1:
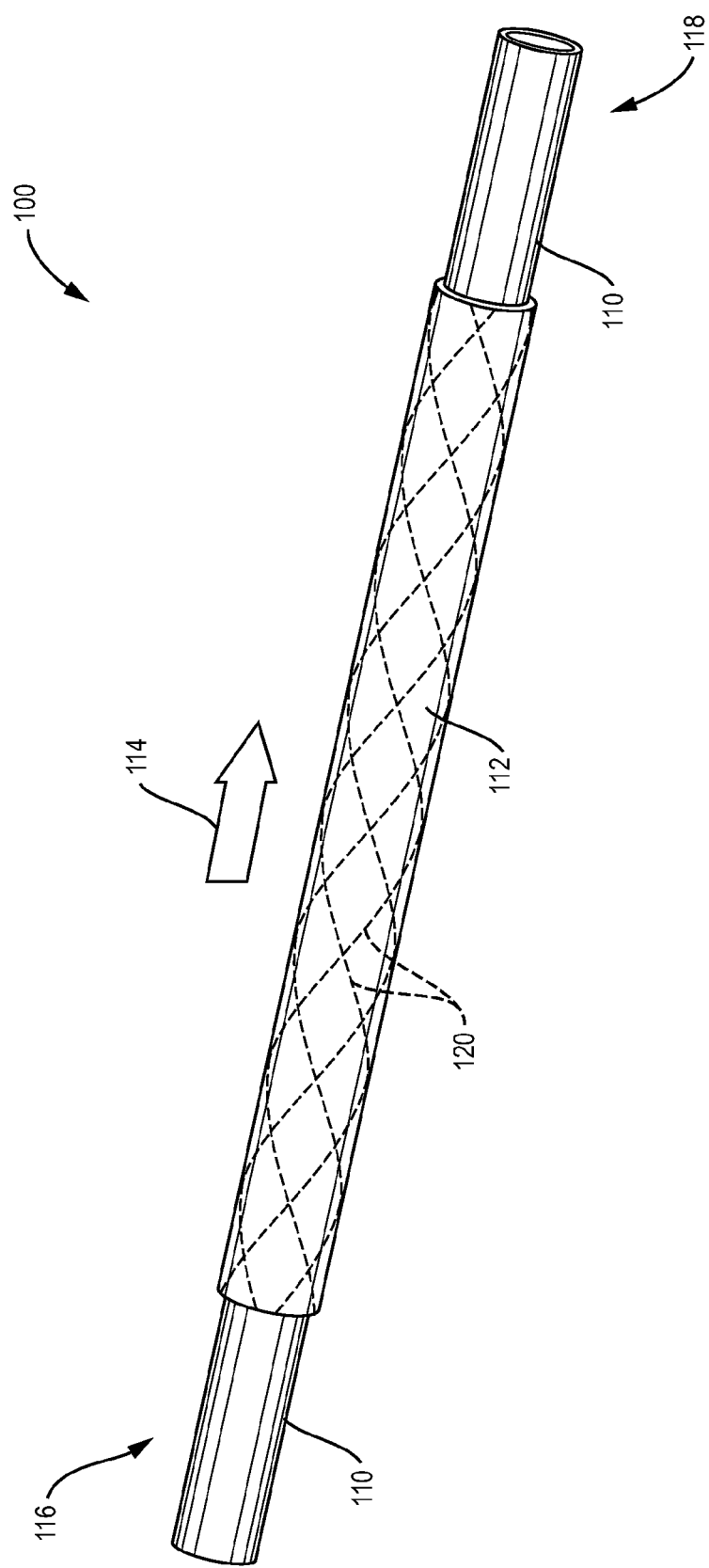
FIG. 1 is a perspective view of a section of pipe having internal arcuate vanes according to an embodiment of the invention.

A description of preferred embodiments of the invention follows. It will be understood that the particular embodiments of the invention are shown by way of illustration and not as limitations of the invention. At the outset, the invention is described in its broadest overall aspects, with a more detailed description following. The features and other details of the compositions and methods of the invention will be further pointed out in the claims.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by $\frac{1}{10}$ of the stated values, e.g., ±10%. For instance, a concentration value of about 30% can mean a concentration between 27% and 33%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the claims include equivalents to the recited values, e.g., variations in the numerical quantity of such values that can occur, but would be recognized to be equivalents by a person skilled in the art.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, and characteristics described in conjunction with a particular aspect, embodiment or example of the invention are to be understood to be applicable to any other aspect, embodiment or example described herein unless incompatible therewith. All of the features disclosed in this specification (including the accompanying claims and abstract, and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including the accompanying claims and abstract), or to any novel one, or any novel combination, of the steps of any method or process so disclosed.

The present invention is directed to an apparatus and methods for increasing the axial velocity of a fluid through a pipe or tube, especially over great distances, for particle separation, and/or for separating immiscible liquids in a mixture. The inventors of the disclosed subject matter designed a number of studies to discover a system for increasing the axial velocity of a fluid through a pipe. Many helical vane systems were selected for testing, each system having no component that restricts or obstructs fluid flow through the pipe. From those, certain systems disclosed herein produced an unexpected, significant increase in velocity, and, to the best of the inventors' knowledge, have never been used previously.

Disclosed herein is a vaned or finned pipe system that can be used to reduce the friction of a fluid such as a fluid chosen from a gas, a liquid, and a two phase mixture of a gas and a liquid, and increase the axial velocity of the fluid, thereby speeding its transport through the pipe. For example, the disclosed system can be used to speed the transport of oil in a pipeline. An embodiment of the vaned system can also be used to separate the immiscible components of a liquid mixture, such as oil and water, or fluids of different specific gravities. In another embodiment of the system it can be used as a particle separation system or a refining system.

The disclosed pipe system can be used to increase the flow rate of water. For example, an embodiment of the vaned system can be used in hydroelectric or micro hydroelectric power generation by increasing the speed of water flow to the hydro-turbines. Micro hydroelectric power is a small scale power system that typically can produce up to 100 kilowatts of electricity using only the natural flow of water downhill, and supply electricity to a single house or to a small community, or connect to electric power networks. In another embodiment, the disclosed system can be used to increase thrust in a rocket, missile, or jet.

One embodiment of the invention is a self-regulating pressure pipe for increasing an axial velocity of a fluid flow of a fluid passing through a channel, tube or pipe. As used herein, the term "self-regulating" with respect to a pressure pipe means that the vanes in the pipe are configured to address variations in volume, viscosity volume of the fluid or the viscosity of the fluid passing through a central passageway in the pipe by decreasing or increasing the pressure within the self-regulating pressure pipe. In one embodiment of the invention a self-regulating pressure pipe has a cylindrical inner wall forming an axially positioned central passageway having an upstream portion and a downstream portion for the fluid flow through the central passageway. The disclosed pipe includes: a first plurality of spaced, arcuate vanes of substantially constant width disposed within the pipe and having a first end and a second end, the first end fixedly attached to the inner wall of the self-regulating pressure pipe, and the second end free and spaced inwardly from the first end, the arcuate vanes projecting inwardly from the interior wall and formed into a first helical spiral. The curvature of the arcuate vanes is substantially the same as the curvature of the inner wall. The arcuate vanes are configured to impart a swirling tangential component to the fluid flow such that a vortex having a low pressure bore forms in the center of the central passageway. The bulk of fluid in the passageway rushes into the low pressure bore, thereby increasing an axial velocity of the fluid flow as the fluid moves through the bore of the central passageway from the upstream portion to the downstream portion. Advantageously, there is no component present that impedes or otherwise restricts the fluid flow through the central passageway.

In a preferred embodiment, the upstream portion of the central passageway comprises and inlet and the downstream portion of the central passageway comprises an outlet and the fluid flow through the central passageway is substantially from the inlet to the outlet. An embodiment of the self-regulating pressure pipe can be used to increase the velocity of a fluid chosen from a gas, a liquid, a two phase mixture of a gas and a liquid, a suspension including solid particles, and combinations of the foregoing.

In general, pressure within a disclosed pipe is regulated by effecting the size of the low pressure bore within the vortex that forms in the central passageway as fluid enters the passageway and strikes the vanes. The height of the vanes, the curvature of the vanes, the number and placement of the vanes, and the diameter of pipe are all pre-selected in constructing the pipe in order to control or determine the size, diameter, or volume of the central high speed bore that will form within the vortex.

With regard to vane height, the maximum diameter of the central high speed bore to which the central bore is able to self-regulate is the height of the first edge of the helical vane closest to the center. The vane height is pre-selected to increase or decrease the pressure and velocity. Over longer distances of pipe, the vane height can be increased with the helical spin values, and the diameter of the pipe can be adjusted in order to maintain a balance of the interior pressures and velocity.

Depending on the desired application, the number of vanes within the system can be increased to allow for an increase in pressure or an increase in velocity of the central bore.

Because the vanes of the disclosed system have the same curvature as that of the inner wall of the cylindrical pipe, as used herein, the term "helix" refers to sections of a helix or helical vane that lie on an imaginary cylinder. As used herein, the term "curvature" refers to the rate of deviation of a curved surface from a plane surface tangent to it. As used herein, the terms "looser helix," "looser helical value," and "lower helical value" are synonymous, and refer to a lowered curvature or degree of curvature of the vanes. A "tighter helix" refers to vanes having a greater curvature. To loosen or lower helical value within the system will increase velocity until centripetal forces are greatly diminished or lost. Tightening the helical values increases centripetal forces until a maximum pressure is reached, whereupon the increased centripetal forces can cause a backpressure or slowing of the flow. Tightening the helical values as fluid is moving through a pipe can have an effect similar to that of increasing vane height because tightening the helix forces more material to the center bore. Tightening the helical values can also have an effect similar to that of decreasing the diameter of the pipe.

When all other above listed options are exhausted the last thing that can be done to maintain velocity and pressure is to reduce the diameter of the pipe.

A preferred embodiment of the invention includes a solid tube or pipe fixedly connected to a section of pipe comprising a perforated wall or a low friction, slippery-surfaced wall. The perforated wall pipe is at least partially covered by a solid casing or outer solid pipe. The perforated wall pipe or the low friction wall includes at least one series of curved or spiral vanes having the same curvature as the curvature of the inner wall of the pipe, and arranged to increase the flow of fluid through the center of the inner pipe. In another embodiment, any type of pipe wall can be fitted with spiral fins to increase the flow of fluid through the pipe.

Figure 2A:
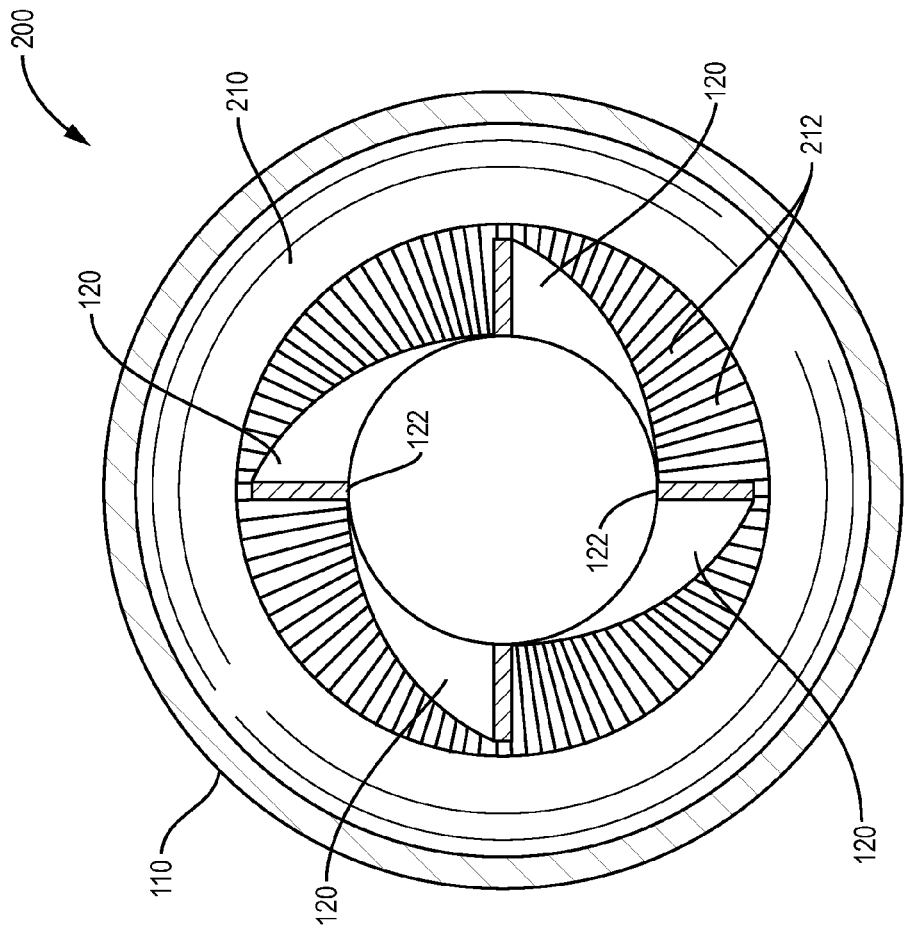
FIG. 2A is a cross-sectional view of a section of pipe according to an embodiment of the invention and depicts 4 free vane edges.

Turning now to the Figures, FIG. 1 is a perspective view 100 of a section of self-regulating pressure pipe 110 having internal arcuate vanes 120 and an outer casing 112 according to an embodiment of the invention. The arcuate vanes 120 organize fluid flow through the self-regulating pressure pipe 110 and induce a spiral motion to the fluid in the center of the passageway. Arrow 114 indicates the direction of fluid flow through the pipe from the upstream end 116 to the downstream end 118. FIG. 2A is a cross-sectional view 200 of a section of a disclosed self-regulating pressure pipe 110, and shows an inner cylindrical, solid pipe wall 210 and an inner cylindrical, perforated pipe wall 212. Four arcuate vanes 120 are disposed within the pipe 110, each vane 120 having a first end fixedly attached to the inner perforated pipe wall 212 (attachments not shown). The drawing shows the second end 122 of each of the four arcuate vanes 120 as free and in what is termed a 180° position, meaning that the free ends 122 of each two vanes 120 are positioned 180° from each other according to an embodiment of the invention.

One embodiment of the invention is a self-regulating pressure pipe wherein n is the first number of the first plurality of spaced, arcuate vanes, and the second ends of the first plurality of spaced, arcuate vanes formed into the first helical spiral are positioned at an upstream end of the first helical spiral in a configuration wherein the second ends are positioned substantially 360 degrees/n from each other. In one embodiment, n is an even number. In another embodiment, n is chosen from 4, 6, 8, 10, 12, and 14. In one embodiment, which may be useful for shorter pipes, a single vane travels through substantially the length of pipe. In another embodiment, multiple sets of vanes are distributed along the length of the pipe.

Another embodiment of the self-regulating pressure pipe includes a first and a second plurality of spaced, arcuate vanes of substantially constant width, wherein the second plurality of vanes is disposed within the pipe downstream of the first plurality of spaced, arcuate vanes and in a configuration substantially similar to the first plurality of spaced, arcuate vanes.

In another embodiment the self-regulating pressure pipe comprises a first and a second plurality of spaced, arcuate vanes of substantially constant width disposed within the pipe, wherein the second plurality of arcuate vanes is disposed downstream of the first plurality of spaced, arcuate vanes. Both the first and the second plurality of spaced, arcuate vanes have a first end and a second end, the first end fixedly attached to the inner wall of the self-regulating pressure pipe, and the second end free and spaced inwardly from the first end, the arcuate vanes projecting inwardly from the inner wall and formed into a helical spiral, the curvature of the spaced, arcuate vanes being substantially the same as the curvature of the inner wall, and configured to impart a swirling tangential component to the fluid flow such that the vortex having a low pressure bore continues in the center of the central passageway, thereby increasing the axial velocity of a fluid flow as the fluid moves through the bore of the central passageway from the upstream portion to the downstream portion, with the proviso that there is no component that impedes or restricts the fluid flow through the central passageway, the low pressure bore having the capability of expanding or contracting in response to the volume of fluid or the viscosity of the fluid flowing through the central passageway, thereby decreasing or increasing the pressure within the self-regulating pressure pipe. In this embodiment, the second ends of the second plurality of spaced, arcuate vanes at the upstream end of the second helical spiral are not aligned with the second ends of the first helical spiral at the upstream end of the first helical spiral.

As the disclosed device is in use, a number of events are happening simultaneously. FIGS. 2B through 2F are cross-sectional schematic views 250b through 250f of a self-regulating pressure pipe 110 that show the basic sequence of events resulting in the induction of a spiral motion to the fluid mass 255 in the center of the self-regulating pressure pipe 110. FIG. 2B is a cross-sectional view of a pipe 110 according to an embodiment of the invention and depicts each of four free vane edges 122 associated with an arrow 252 showing the direction of movement of a fluid 255 over the vanes 120 as the fluid 255 flows through the pipe 110.

FIG. 2C depicts the formation of a low pressure central bore 256 of a vortex rotating in the direction shown by arrows 254 in the central passageway of the self-regulating pressure pipe 110 as a result of the swirling tangential component to the fluid flow over the vanes 120 as shown in FIG. 2B. For simplification, the "flipping action" or rapid movement of the fluid 255 over vanes 120 as shown in FIG. 2B is not depicted in FIG. 2C, although the action continues, and is what induces a spiral motion to the fluid 255 in the central passageway.

FIG. 2D depicts the manner in which the central bore 256a, 256b, is able to self-regulate. As the axial velocity of the fluid 255 increases, the central bore will expand, forming a high velocity central bore 256b. As the axial velocity decreases, the central bore will become relatively smaller, as shown by low velocity central bore 256a, and would eventually dissipate. The central bore 256a, 256b has little frictional loss of energy because it is designed to remain in the central passageway, expanding only in the area between opposing fins, and to not make direct contact with the inner walls of pipe 110.

FIG. 2E depicts the pipe 110 and fluid movement as shown in FIG. 2B, with the addition of dots to represent a greater concentration of fluid 255a on one side of each vane 120, and an indication of a lower concentration of fluid or low pressure area 257 on the opposing side of each vane 120. Because of the difference in pressure on each side of the vanes 120, the fluid 255a will move over the top of the vanes 120 from the high pressure side to the low pressure side 257, inducing a spiral motion to the central fluid mass 255 and increasing the horizontal velocity of the central fluid mass 255. The self-regulating central bore 256 is able to expand and contract to process many different flow velocities. FIG. 2F combines the two directions of fluid motion as shown in FIG. 2B and FIG. 2C.

Figure 3A:
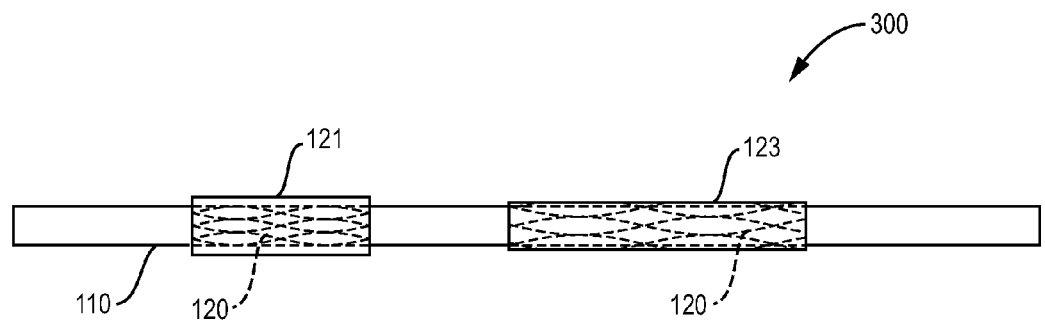
FIG. 3A is a side elevational view of a pipe showing a series of internally vaned sections separated by a distance according to an embodiment of the invention.
Figure 3B:
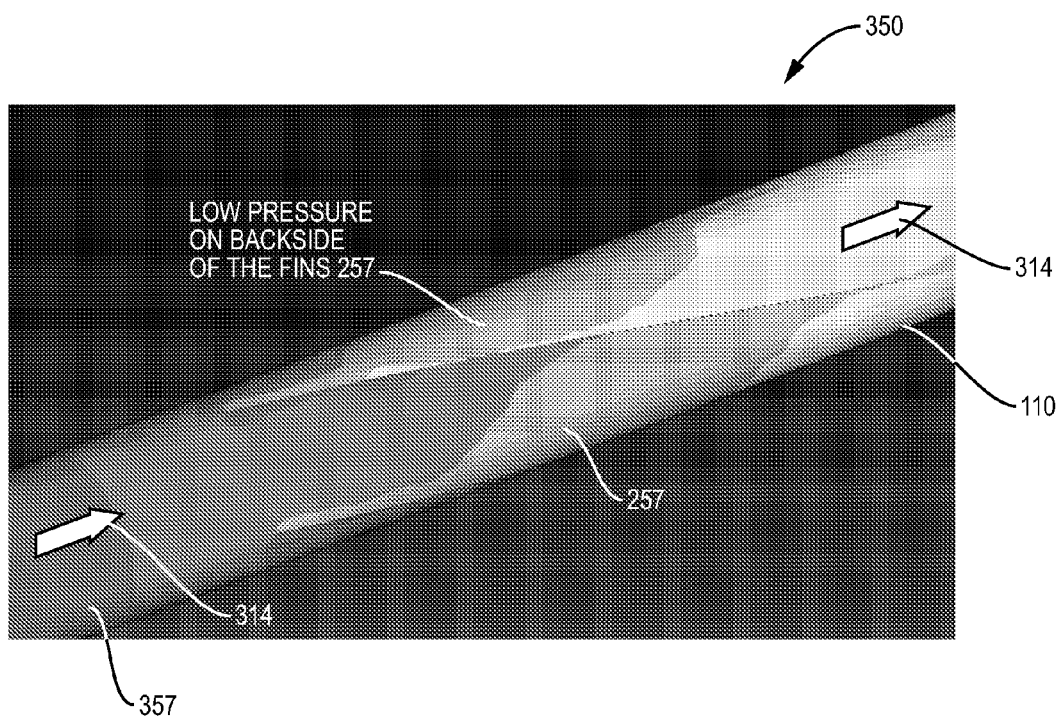
FIG. 3B is a representation of a fluid flow static pressure simulation in a vaned pipe according to an embodiment of the invention showing low pressure on backside of the vanes.

FIG. 3A is a side elevational view 300 of a disclosed pipe 110 showing two series of internally vaned sections 121, 123 separated by a pre-determined distance. FIG. 3B is a representation of a static fluid flow pressure simulation 350 in a section of a disclosed vaned pipe 110 showing a pressure differential in pipe 110, including low pressure 257 on backside of the vanes 120 (not shown) and high pressure 357 upstream of vanes as a fluid flows through disclosed self-regulating pressure pipe 110 in the direction shown by arrow 314.

FIG. 4A is a representation 400 of fluid flow velocity vectors of the fluid flow in a disclosed vaned pipe. FIG. 4B is an enlargement of a section 450 of the pipe shown in FIG. 4A. Computational fluid dynamics (CFD) modeling shows a large increase in velocity within the center of the system's cross-sections (not shown) and a pressure differential along the surfaces of the arcuate vanes. The simulation shows low pressure areas 456 and higher pressure areas 458. The CFD simulation correlates well with empirical testing results. The heavier or more dense fluid is thrown to the side walls of the pipe 110, and the system can be configured as a separation system if desired. Notice the swirling or cyclone effects 454 of the fluid as it travels through the array of arcuate vanes.

Oil or Natural Gas Pipeline and Pumping Equipment

The disclosed self-regulating pressure pipe for increasing a rate of a fluid flow of a fluid can, in one embodiment, be used to transfer more fluid material, for example, oil, natural gases, water, or air in less time, than can be accomplished by commercially available methods. The efficiency of the disclosed pipe system, when used for pumping water for irrigation or for evacuating water from floods, is greater than that of existing systems. That is because the disclosed self-regulating pressure pipe increases the flow rates as compared to flow rates achieved by existing systems.

A high powered pump initially pushes the oil or other fluid into the pipe, and pumping stations may be required along the length of the system. As the fluid travels down the pipe, the vaned sections of the pipe push the faster moving fluid to the center of the pipe. The vanes act like an airplane wing by creating a low pressure. But instead of producing lift, the vanes increase velocity of the oil by producing a low pressure or partial void on the flip side of vanes that causes oil to rush in, filling the void and increasing horizontal velocity.

Use of a super-slick, low friction, dimpled or perforated material lining inner pipe walls reduces frictional loss of horizontal velocity. As explained above, once sufficient velocity is formed, the spinning motion of fluid over the vanes produces a high speed vortex in the center of the pipe by the continuous rushing of oil to fill the void beneath the vanes. That action is what spins the center bore. The system can be vaned throughout the length of the pipe or can have separations, that is, sections of vaneless pipe interspersed with lengths of the disclosed vaned pipeline systems. The disclosed system can also be used in oil riser pipes.

There are tens of thousands of miles of oil and gas pipelines crisscrossing the United States, connecting oil fields, ports, refineries, and major distribution points. The disclosed system is effective for use in transporting fluid over great distances, in particular by including a plurality of sets of disclosed arcuate vanes. An example of a potential use of the disclosed system is the Trans-Alaska Pipeline System, which stretches for 800 miles from an oil well near Prudhoe Bay across the state of Alaska to Valdez. Prudhoe Bay freezes in the winter, while the port of Valdez is ice-free year round. Oil from the well is flowed down the pipeline to the port of Valdez, where it is uploaded onto a supertanker which moves the oil to another port where it is off-loaded into another pipeline that carries the oil to a refinery. The steel wall of the pipeline can potentially get as cold as about minus fifty degrees Celsius, which is equal to about minus 60 degrees Fahrenheit.

There are two systems, one for cold conditions and one for warmer conditions. In general, a system designed for use in cold temperature uses an outer pipe comprising a steam chamber and surrounding an inner, finned pipe. In one embodiment the fins extend, for example, approximately two-thirds (⅔) of the way into the steam chamber area. Heat is captured or absorbed by the fins in the steam area and transmitted to the oil in the inner pipe. Increasing heat to the fluid flow in many applications increases the velocity of the fluid flow by decreasing viscosity, and by increasing the velocity of the high speed bore.

Figure 5A:
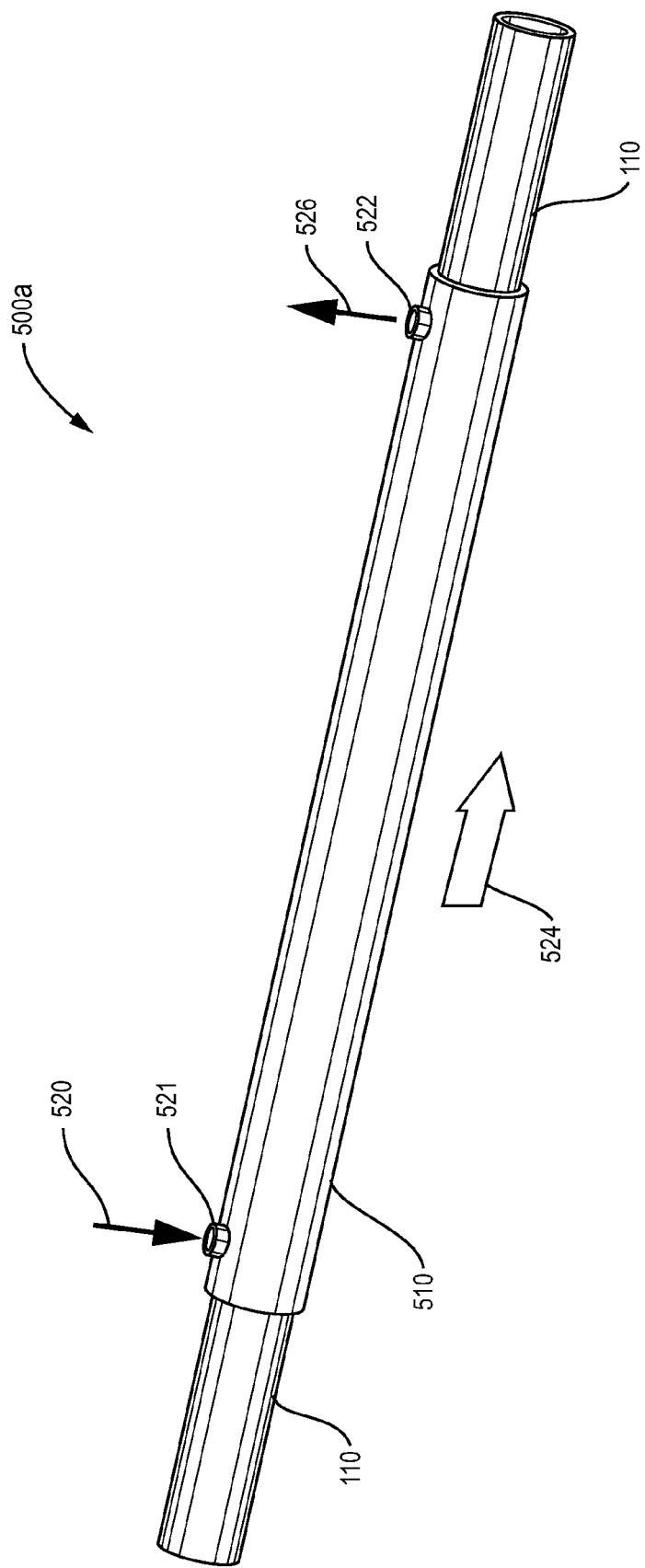
FIG. 5A is a perspective view of a section of pipe having a jacket of steam surrounding a pipe having internal arcuate vanes according to an embodiment of the invention.

An embodiment of the invention that can be used to raise the temperature of the oil or other fluid in order to reduce frictional loss of velocity as the fluid travels through a pipeline is depicted in FIG. 5A through FIG. 5C. FIG. 5A shows an external view 500 of a section of pipe 110 having a jacket 510 of steam surrounding the pipe 110 having internal arcuate vanes 120 as shown in FIGS. 5B and 5C. Steam enters inlet 521 of jacket 510 in the direction of arrow 520, travels through a chamber beneath the outer wall of jacket 510 in the direction shown by arrow 524 to outlet 522 where the steam exits in direction of arrow 526. Condensate from the steam can be re-heated to form steam that can re-enter inlet 521.

FIG. 5B is a sectional view 550 of a portion of the disclosed pipe 110 shown in FIG. 5A. FIG. 5C is shows a larger portion 570 of the pipe 110 depicted in FIG. 5B. The embodiment depicted in FIGS. 5B and 5C extends the portion 530 of the vanes 120 into the steam chamber 512 in order to heat the pipe 110 walls. Solid heat is captured by the vanes 120 and transferred to the oil or other fluid flow. By so increasing oil or other fluid temperatures, flow rates are increased.

The second system is for use in tropical or warmer areas. The warm conditions system includes an inner, vaned pipe 110 transporting the oil. Those vanes 120 extend through the outer wall of pipe 110 capturing radiant heat from the sun. In a tropical area, a pipeline above ground would not need a steam chamber, but instead the portion 530 of vanes 120 could extend into the air to capture radiant heat from sunlight.

Separations and Refining Processes

Figure 7:
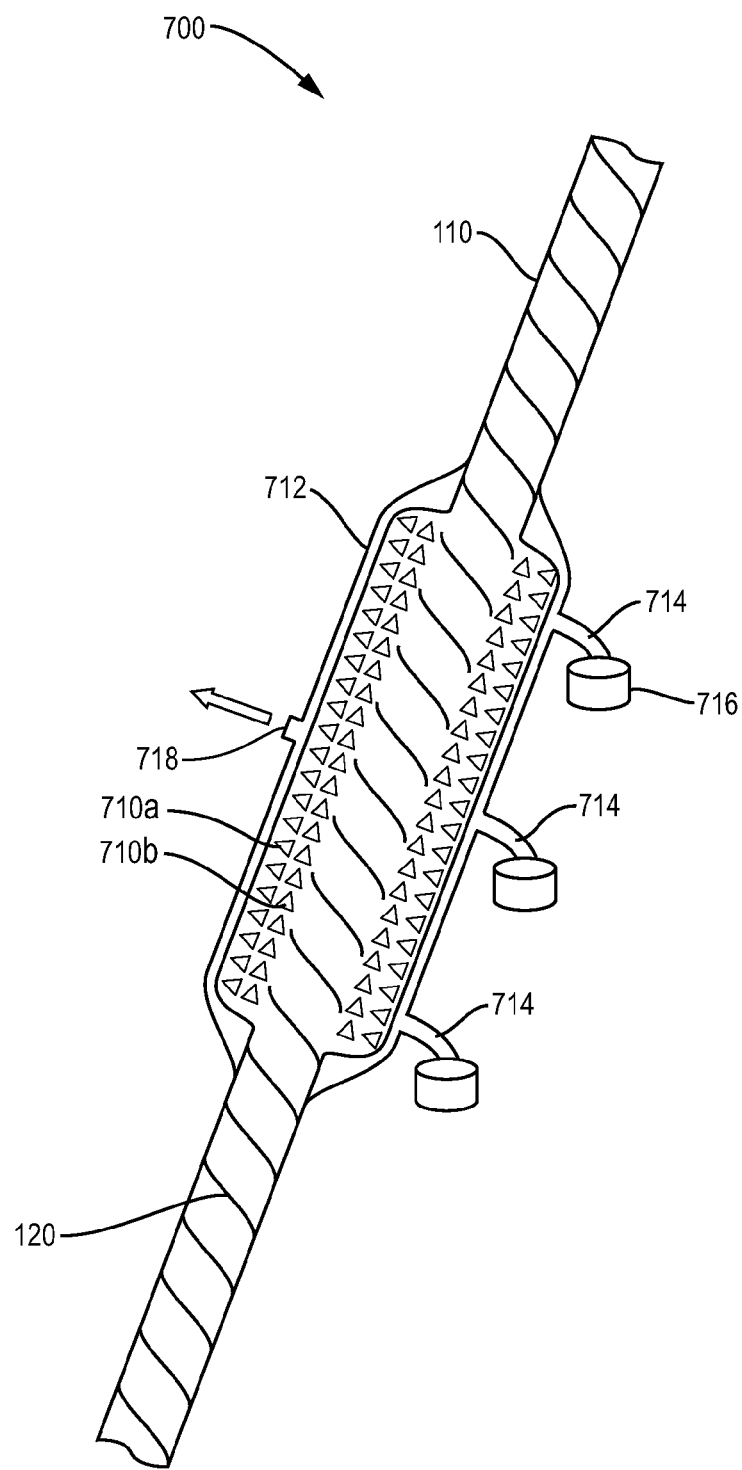
FIG. 7 is a representation of a vaned pipe having a section of wall that comprises two perforated materials at least partially covered with a solid material according to an embodiment of the invention.
Figure 13:
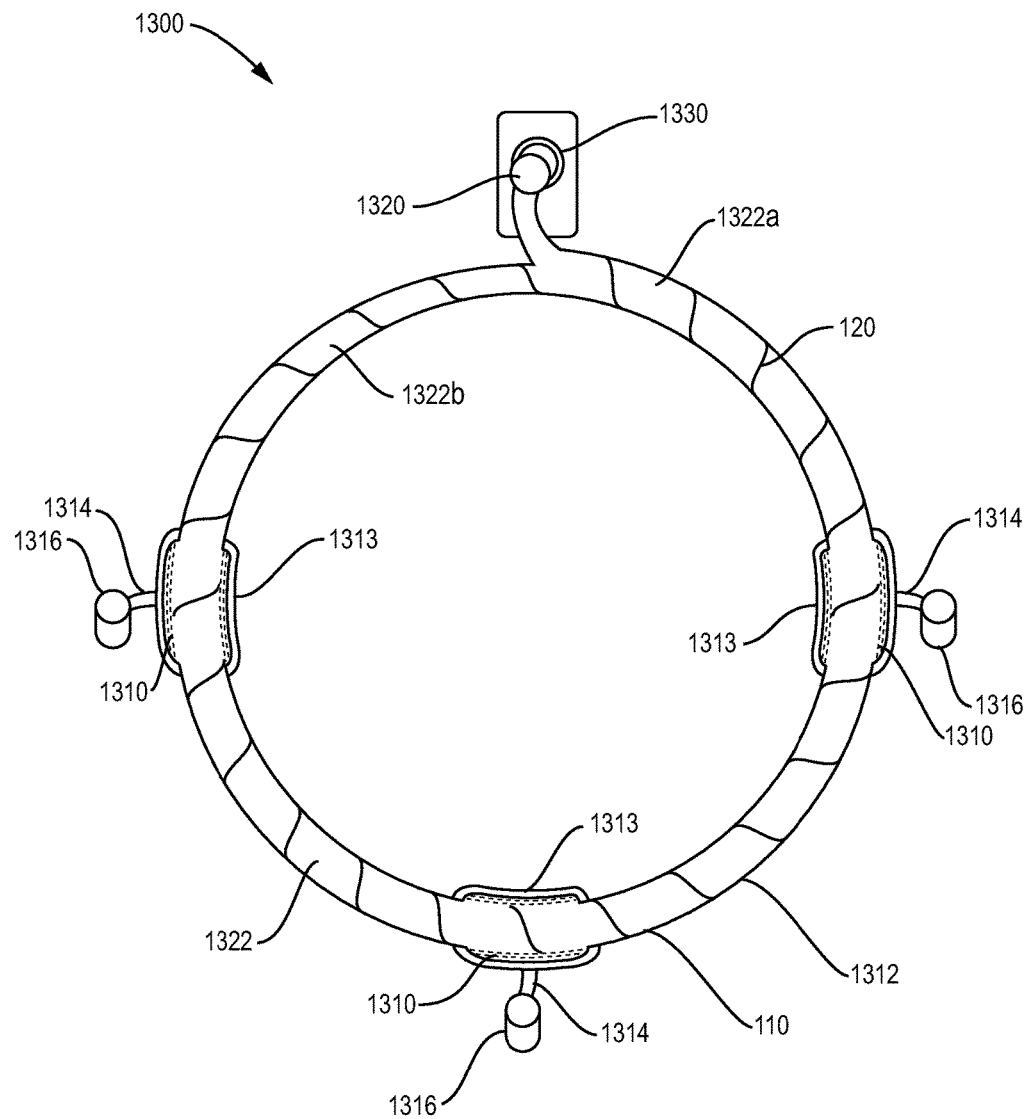
FIG. 13 depicts a looped tubular system having arcuate vanes and sections of perforated walls for refining and particle separation according to an embodiment of the invention.

We have discovered that an embodiment of the disclosed system can be used as a separation system because as a fluid mixture is injected into the disclosed vaned pipe, centripetal force pushes the heavier components of the mixture to the wall of the pipe, leaving the lighter weight or most refined materials components in center. Because the high speed bore in the center of the disclosed pipe rotates faster than the axial fluid flow, heavier components are thrown or spun out to the sidewalls of the pipe. In an area wherein the sidewalls are perforated, the components thrown to the perforated wall can be collected, as shown in FIG. 7 and FIG. 13.

Figure 6A:
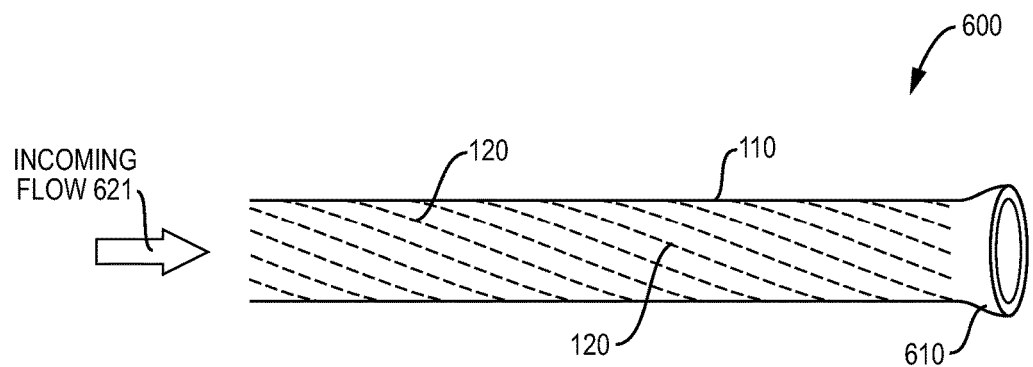
FIG. 6A is a side elevational view of a pipe having a flanged end at an outlet according to an embodiment of the invention.
Figure 6B:
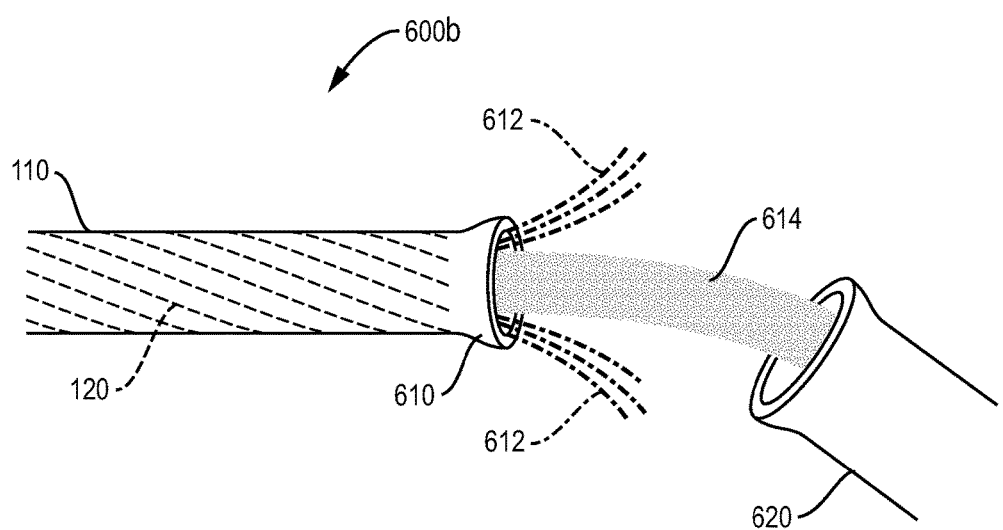
FIG. 6B is a side elevational view of the pipe depicted in FIG. 6A, showing its use in an oil-water separation process.

There are at least three systems. First, an embodiment of a disclosed oil-water separation system for use in an oil spill cleanup operation, for example, is depicted in FIGS. 6A and 6B. FIG. 6A shows a side elevational view 600 of disclosed pipe 110 having a flared exit end 610 or flanged outlet 610 of a central passageway within pipe 110 and disclosed internal arcuate vanes 120. The direction of an incoming flow of an oil-water mixture is shown by arrow 621. According to an embodiment of the invention, as the oil-water mixture moves over the internal vanes 120, the more dense/heavier component, water, is spun by centripetal force to the inside pipe wall, and oil or lighter weight materials are forced to the center of the pipe 110. The effect of the exit end 610 being flared is shown in use as system 614 in FIG. 6B. Water 612 is spun out of flanged outlet 610 in an umbrella-like pattern wherein it can be re-captured, and the less dense component, oil 614, in the center bore continues in its forward path wherein it can be captured by catchment system 620 and further processed.

As a water separation system, the goal is to have sufficient spin and length of a set of disclosed arcuate vanes to produce the torsional flow or spin necessary to separate components of the oil-water mixture so that when the mixture reaches the end of the system, a simple flange can be used to separate the water from the oil. The pipe 110 can have cylindrical internal walls with indentations, also referred to herein a "dimpled surface," or a high-slick, slippery or low-friction surface.

One embodiment of the concept includes having high flow pumping equipment collect both water and oil. Install the disclosed system a distance of from about 10 feet to about 15 feet downstream for larger pumps, and from about 5 feet to about 6 feet for smaller pumps. The effect is that the pumping equipment positioned downstream is assisted by having an increase in natural flow rates, the natural flow removing part of the work load from the pumping equipment and making it more energy efficient. This system was originally designed for use in cleaning up an oil spill.

Another embodiment of a gas, liquid, and particle separation system 700 for separating the components of a fluid comprising at least one of a liquid, a gas or a solid, is depicted in FIG. 7. System 700 includes pipe 110 having at least one vaned section wherein the first end of each vane 120 is fixedly attached to a cylindrical inner wall comprising a perforated material 710a and/or 710b. An outer surface of the perforated material 710a, 710b is at least partially covered by a solid exterior wall or sleeve 712. In one embodiment there are at least two layers of perforated material 710a and 710b wherein each perforation is triangular shaped, and the triangular perforations in one layer are oriented so as not to substantially align with the perforations in the other layer. For example, the triangular perforations of one layer can be positioned to be offset or rotated by about 90 degrees from the perforations in the other layer, as is in the embodiment shown in FIG. 7.

As shown in FIG. 7, one or more liquid or particle collection pipes 714 can be inserted through the solid sleeve 712 to collect liquid or particles that are being separated by centripetal force as the fluid passes through the disclosed self-regulating pressure pipe 110. The collection pipes 714 are fluidly connected to collection containers 716. At least one gas collection pipe 718 penetrates solid sleeve 712 to collect a gas. Separation system 700 can be designed or configured to optimize collection of components with different specific gravities. The amount of a component spun to the walls and collected can be controlled by determining the best helical value for the particular application. One may need to test for best flow by loosening or tightening the helical value and/or the height of the vanes 120. The denser material in the flow would be spun out to the expanded area comprising the perforated walls, where it can then be captured as described above, and further processed.

The above-described design would be effective for applications ranging form natural gas and fuel refining to particle separation systems. One can simply keep refining by using a long tube or pipe with a more than one plurality of spaced, arcuate vanes of substantially constant width according to the disclosed self-regulating pressure pipe, each plurality of vanes spaced apart from another plurality of vanes. The long particle separation tube according to one embodiment of the invention is a straight tube, and in another embodiment is a large circular tubing or closed loop system wherein velocity, pressure, and temperature can more easily be continuously monitored and controlled. One embodiment of a closed loop system is depicted in FIG. 13.

A looped system shown in FIG. 13 is similar to the separation system 700 shown in FIG. 7, except that in FIG. 13, the disclosed self-regulating pressure tubing is formed into a loop. FIG. 13 depicts a looped tubing system 1300 for centripetal refining and particle separation according to one embodiment of the invention. Looped tubing system 1300 includes a looped self-regulating pressure tubing or a looped self-regulating pressure piping for increasing a rate of a fluid flow of a fluid and configured to respond to the volume of the fluid or the viscosity of the fluid by decreasing or increasing the pressure within the looped self-regulating pressure tubing or piping. As used herein, the terms "looped self-regulating pressure tubing," "looped self-regulating pressure piping," and "disclosed looped pressure piping" are synonymous. The disclosed looped pressure piping 1300 has a cylindrical inner wall 1310 and a cylindrical outer wall 1312 forming an axially positioned central passageway 1322 having an upstream portion 1322a and a downstream portion 1322b for the fluid flow through the central passageway 1322, the disclosed looped pressure piping 1300 comprising: a first plurality of spaced, arcuate vanes 120 of substantially constant width disposed within the central passageway 1322 and having a first end and a second end, the first end fixedly attached to the inner wall 1310 of the disclosed looped pressure piping 1300, and the second end free and spaced inwardly from the first end, the arcuate vanes 120 projecting inwardly from the cylindrical inner wall 1310 and formed into a first helical spiral, the curvature of the arcuate vanes 120 being substantially the same as the curvature of the cylindrical inner wall 1310, the arcuate vanes 120 configured to impart a swirling tangential component to the fluid flow such that a vortex having a low pressure bore forms in the center of the central passageway 1322, thereby increasing an axial velocity of the fluid flow as the fluid moves through the bore of the central passageway 1322 from the upstream portion 1322a to the downstream portion 1322b, with the proviso that there is no component that impedes or restricts the fluid flow through the central passageway 1322, the low pressure bore having the capability of expanding or contracting in response to the volume of fluid or the viscosity of the fluid flowing through the central passageway 1322, thereby decreasing or increasing the pressure within the disclosed looped pressure piping 1300.

Each plurality of spaced, arcuate vanes 120 in the disclosed looped pressure piping 1300 is described herein as a "set of arcuate vanes." Typically, the disclosed looped pressure piping 1300 comprises a plurality of sets of arcuate vanes 120 spaced apart from each other in the looped piping 1300. The disclosed looped pressure piping 1300 has an inlet 1320 to the central passageway 1322, the inlet 1320 typically connected to an exterior power source 1330 to increase the initial velocity of fluid injected into the inlet 1320 in order to optimize separation velocities. The vanes 120 in at least one of the sets of arcuate vanes 120 are disposed within a portion of the central passageway 1322 bounded by an inner wall 1310a that is perforated. The outer wall 1312b is perforated. The first ends of the vanes 120 are fixedly attached to the perforated inner wall 1310a. The perforated outer wall 1310b is at least partially covered by a solid exterior wall or sleeve 1313.

As shown in FIG. 13, one or more liquid or particle collection pipes 1314 can be inserted through the solid sleeve 1313 to collect liquid or particles that are being separated by centripetal force as the fluid passes through the disclosed looped pressure piping 1300. The collection pipes 1314 are fluidly connected to collection containers 1316. The collection pipes 1314 may be turbo driven. The looped tubing system 1300 for centripetal refining and particle separation allows the fluid to re-circulate in order to facilitate extractions and to provide further refinement to the products.

FIG. 8A shows a stage of partial construction of a vaned self-regulating pressure pipe 800 similar to the pipe depicted in FIG. 7 according to an embodiment of the invention. Two sections of solid pipe 110 are attached, for example by pressure fitting or by welding to either end of a perforated pipe 810 of smaller diameter than the diameter of solid pipe 110 or to perforated pipe 816 of larger diameter than that of solid pipe 110. In another embodiment two solid pipes 110 can be welded together. In yet another embodiment (not shown) a solid ring can be used to join two sections of pipe together. FIG. 8B is an enlarged view of a section of piping shown in FIG. 8A. The perforations 812a are shown as triangular shaped openings pointing in an axial direction of perforated pipe 810, but the openings can be of any shape, e.g., circular. Perforated pipe 810 can comprise multiple layers of perforated material. In the embodiment shown in FIGS. A and B, perforated pipe 816 forms a second layer over two sections of perforated pipe 810. In the embodiment shown, perforated pipe 816 has triangular openings 812b pointing up at about 90 degrees from the orientation of triangular openings 812a.

Non-limiting examples of materials suitable for construction of the disclosed self-regulating pressure pipe 110 include stainless steel solid or perforated piping and molded polymer material. An example of constructing the disclosed pipe from steel includes making spaced apart helical cuts in the wall of the steel pipe, twisting the pipe so as to expose the interior wall surface of the pipe, and then welding the first end of each vane to the inner pipe wall.

Pressure as a Function of Fluid Flow Rate in Pipes Having Two Vaned Sections

Figure 9:
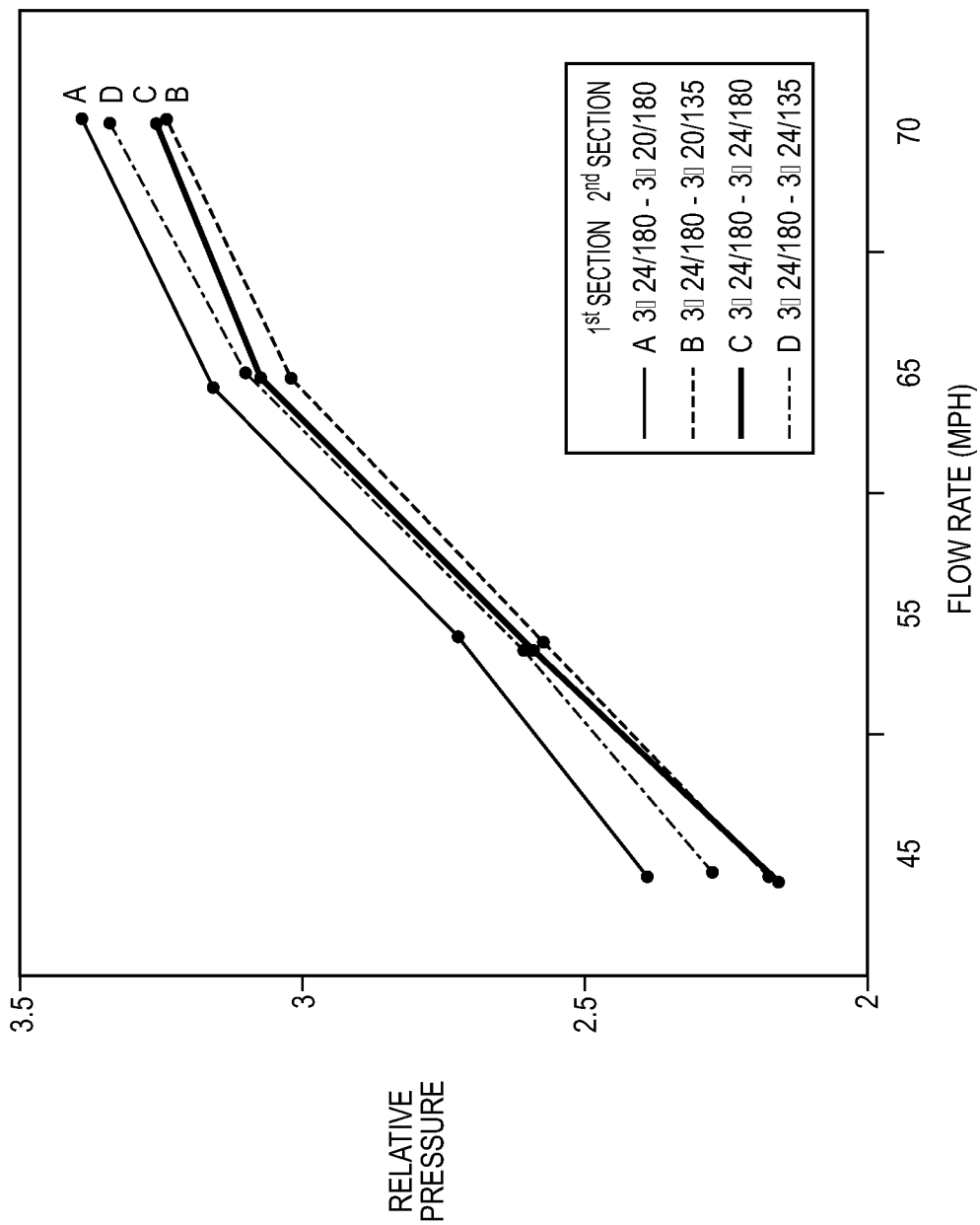
FIG. 9 is a graphical representation of relative pressure as a function of flow rate of a gaseous fluid in four different pipes wherein each pipe has 2 sections according to an embodiment of the invention.

FIG. 9 is a graphical representation of relative pressure as a function of flow rate of a gaseous fluid in four different disclosed pipes 110, labeled "A, B, and C," respectively in FIG. 9. Each disclosed pipe 110 has two sections having a three (3) inch internal diameter, and four arcuate vanes of the same helical value. As used herein, the "same helical value" means having the same height, twist, and length. The first section of each pipe is 24 inches in length, and the second free ends 122 of the first helical spiral at the upsteam end of the first section are positioned substantially at 90 degrees from each other, as shown in FIG. 2A. This is referred to as the "180 position" because each of a pair of vanes lie 180 degrees from one another.

The second section is downstream of the first section and its four arcuate vanes are in a second helical spiral spaced apart from the first helical spiral. In pipes 110 labeled A and C, the second free ends of the second helical spiral at the upstream end of the second helical spiral are aligned with the second ends of the first helical spiral, in the 180 position. The second section pipe A is 20 inches in length, and the second section of pipe C is 24 inches in length.

The second section of pipes B and D, respectively have the second free ends of the second helical spiral at the upstream end of the second helical spiral not in alignment with the second ends of the first helical spiral, but rather turned 135 degrees from the position of the first helical spiral. The lengths of the second section in pipes B and D are 20 inches and 24 inches, respectively. The goal is to maintain pressure relatively low, while increasing flow rate (MPH).

In one embodiment of the invention, the first set of arcuate vanes has the 180 position, and the second set of vanes has a 135 degree twist from the orientation of the first set of vanes.

Micro Electric and Hydroelectric Power

Figure 10:
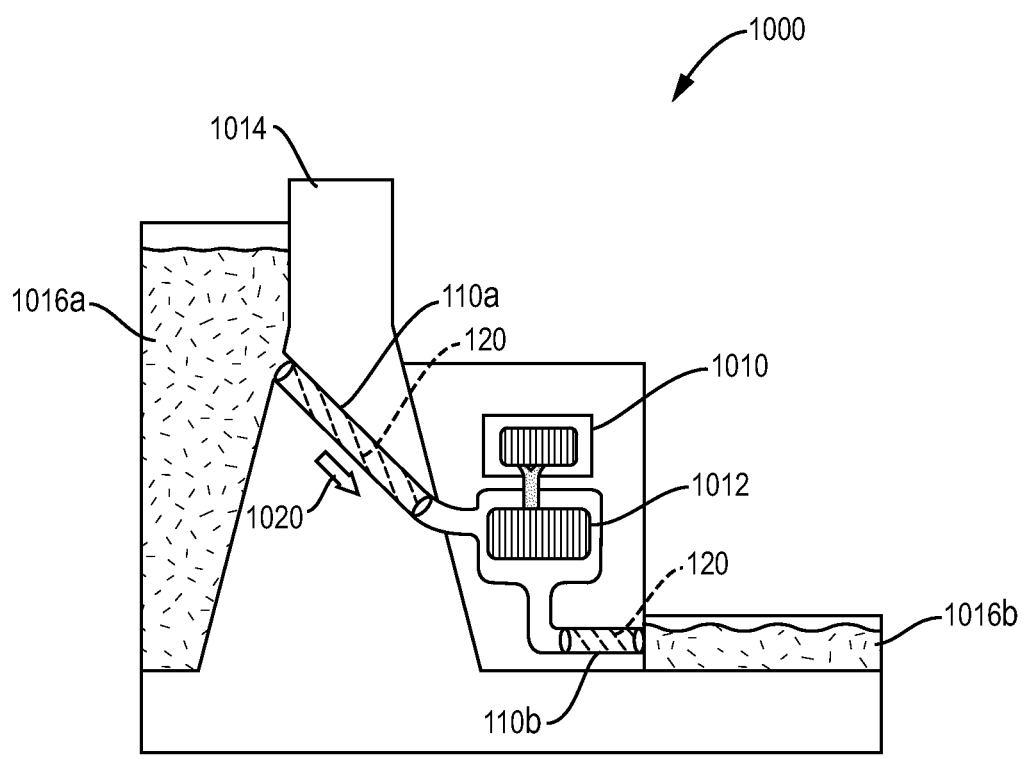
FIG. 10 schematically represents use of a pipe according to an embodiment of the invention for accelerating water flow to the turbine of a generator.

The use of an embodiment of the disclosed arcuate vaned system in hydroelectric or micro hydroelectric power generation by increasing the speed of water flow to the hydro-turbines was described generally above. FIG. 10 depicts a system 1000 of pipes 110a, and optionally, 110b, according to an embodiment of the invention for accelerating water flow to the turbine 1012 of a generator 1010. FIG. 10 shows a reservoir 1016a contained by a dam 1014. For example, using gravity, water from a lake or the reservoir 1016a that is uphill from turbine 1012 can be flowed in the direction shown by arrow 1020 downhill through a disclosed pipe 110a having arcuate vanes 120 to turbine 1012. The vanes reorganize the water flow, thereby increasing the velocity and kinetic energy of the flow to be captured by turbine 1012. In one embodiment of the invention, all internal pipes (not shown in FIG. 10) are perforated, and have arcuate vanes 120 having the same curvature as the perforated inner pipes. The arcuate vanes 120 are attached at one end to the inner perforated pipe as described above. There is no component that substantially impedes or restricts the water flow through the central passageway of the pipes 110a, 110b. For example, multiple sections each comprising four to eight arcuate vanes 120, depending on the length and diameter of the pipes 110a, 110b. In one embodiment, a variable nose funnel (not shown) is attached at the end of pipe 110a closest to turbine 1012 to control water flow.

After turning turbine 1012, in one embodiment of the invention, the water is flowed through pipe 110b having arcuate vanes 120 to container, lake, river, or reservoir 1016b. The disclosed, arcuate vaned pipes can also be used in fire hoses, garden hoses, hover craft, and jet boats.

Steam Turbines

Intense radiant energy or flash heat, such as heat from burning oil, coal, or wood, is often the source of initial or primary heating for use in a steam turbine to generate electricity. There is a large amount of heat lost in using currently available systems for heat transfer, making these systems inefficient. One embodiment of the invention is a disclosed system of piping having the disclosed arcuate vanes to increase fluid flow and having no hindrances or obstructions to fluid movement within the vaned piping, wherein the system is used to increase the efficiency of energy conversion by steam turbines. First, the disclosed system of piping can be used to increase the flow of heat from the initial flash heat to liquid water. Then, as the water is converted to steam, the disclosed system of piping can be placed before the steam turbines to increase the velocity of steam impinging upon the turbines.

Figure 11:
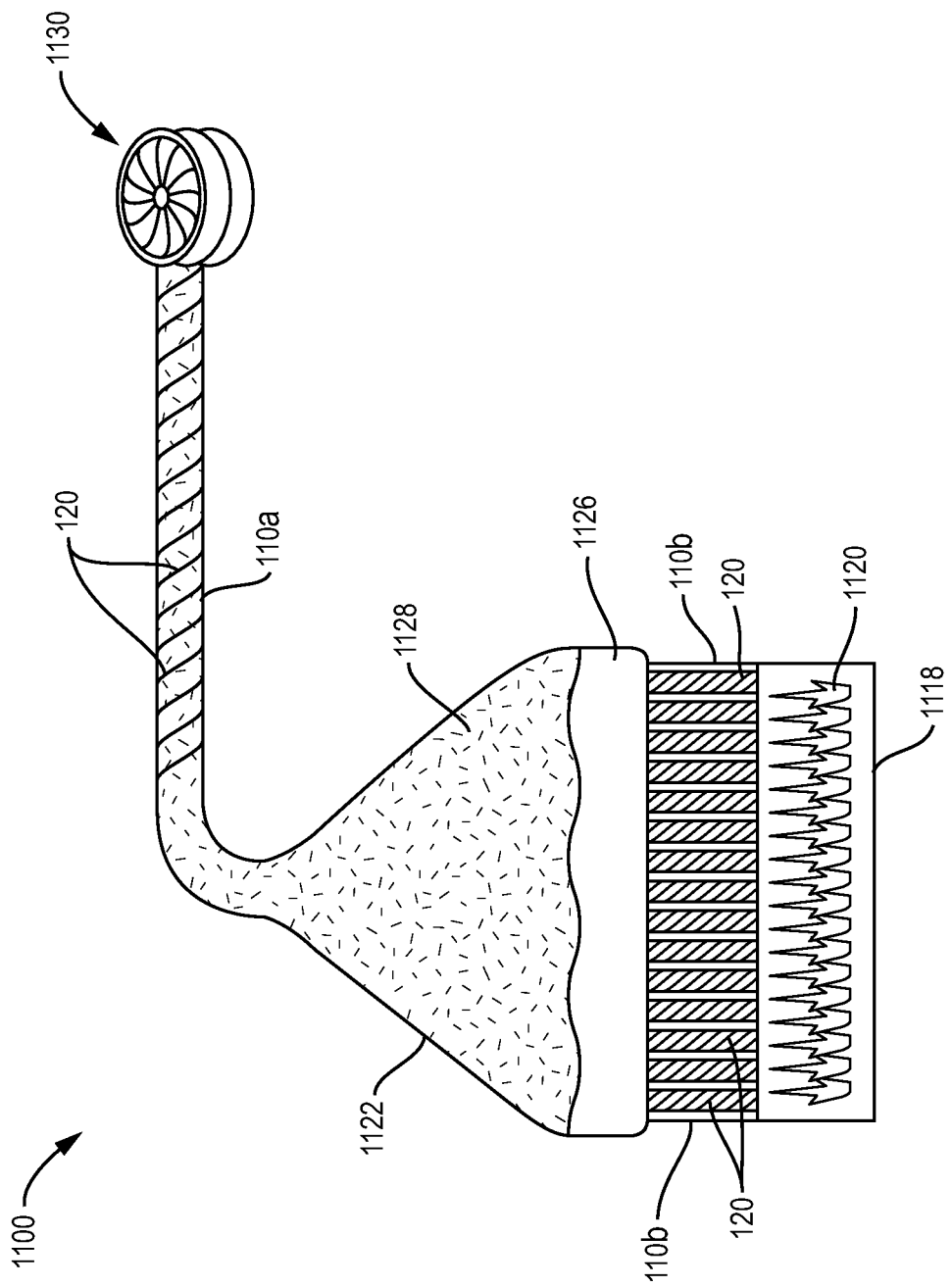
FIG. 11 is a schematic representation of a use of a plurality of arcuate-vaned pipes suspended over a heat source for heating water to convert it to steam, and arcuate-vaned pipes leading the steam to a turbine according to an embodiment of the invention.

FIG. 11 depicts such a system 1100 that can increase the efficiency of a steam turbine 1130. FIG. 11 depicts a flash heat source 1120 as burning a fuel, the heat source 1120 positioned beneath a vertically positioned array of pipes 110b having disclosed arcuate vanes 120 and acting as chimneys 110b. Compared to currently available systems, the chimneys 110b are able to capture an increased amount of heat from flash heat source 1120, and to lower the amount of soot produced by burning the carbon-based fuel. This increase in efficiency of energy conversion is due in part to the fact that the chimneys 110b increase hot air flow away from the flash heat source 1120 and up the chimneys 110b, allowing for more air to enter the burning chamber 1118. The disclosed system minimizes heat loss because it makes a flash burn more productive in part by focusing maximum heat to the liquid water 1126. In one embodiment, a grid of solid heat rods (not shown) can be used in combination with chimneys 110b. The pipes or chimneys 110b increase the flow of hot air through the chimneys 110b to liquid water 1126 in container 1122, where the liquid water 1126 is converted to steam 1128. FIG. 11 shows an embodiment having a conical-shaped container 1122 holding the liquid water 1126 and the steam 1128. Steam 1128 exits the container 1122 through a tube 110a at its top. In one embodiment, tube 110a is also a disclosed vaned pipe that increases the velocity of the steam exiting the container 1122 as the steam 1128 travels to the steam turbine 1130. Increasing steam flow rates to the turbine 1130 also provides greater power generation from a given amount of carbon-based fuel used as primary heat source.

Rockets, Jets, Missiles

Figure 12B:
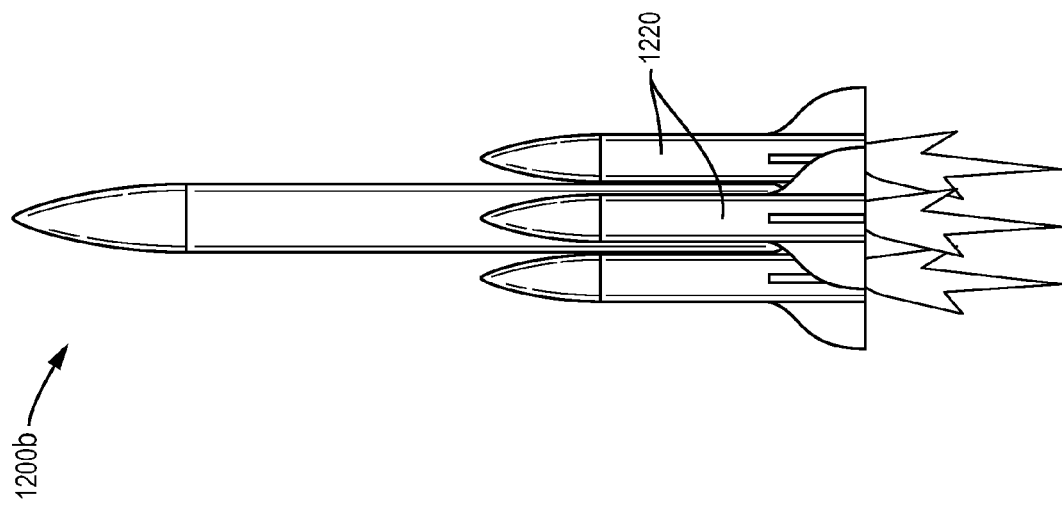
FIG. 12B is a schematic representation of a rocket having multiple boosters, wherein both the rocket and boosters have internal arcuate vaned sections.
Figure 12A:
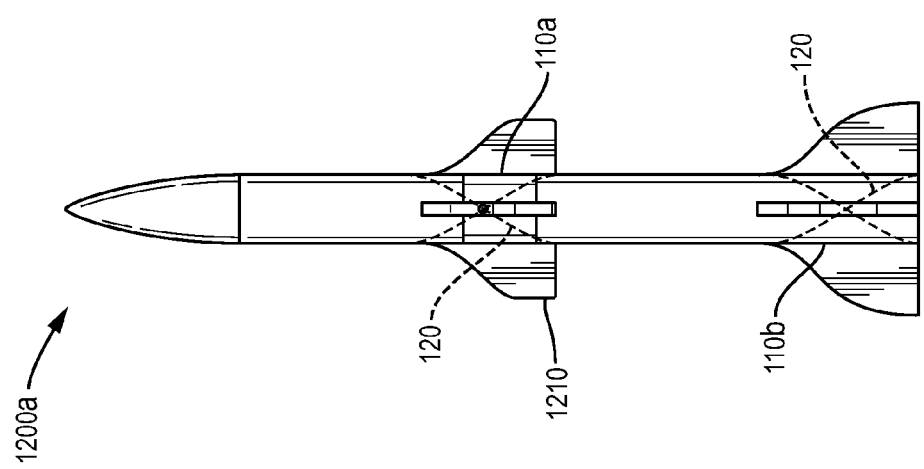
FIG. 12A is a schematic representation of a rocket having internal arcuate vaned sections according to an embodiment of the invention.

The disclosed system of arcuate vaned piping can be used to increase thrust in rockets, jets, and missiles. FIG. 12A depicts a rocket or missile 1200a having internal pipes 110a, 110b, each pipe having arcuate vanes 120 according to an embodiment of the invention. Counter-rotating fins 1210 have been previously used for stabilization. FIG. 12B depicts a rocket 1200b having at least one internal pipe with arcuate vanes as in rocket or missile 1200a. Additionally, rocket 1200b has a plurality of booster rockets 1220, also having internal arcuate vanes. The internal arcuate vanes are not depicted in FIG. 12A or FIG. 12B.

Typically, placement of the disclosed vaned pipe is at the bottom of the rocket, as shown in FIG. 12A, pipe 110b. In one embodiment, vaned pipe 110b can extend out beyond the outlet of the main rocket body. Most rockets have limited internal space, so the disclosed system could typically be placed at the bottom of the rocket.

While the disclosed thrust system can provide for a heavier payload or a faster speed by adding additional thrust to the rocket, the spin action of a single thrust system without the use of external stabilizing fins 1210 would cause instability during flight. It should also be noted that, with rocket or missile systems, evenly numbered thrust systems are able to self-compensate for the spin action created by the disclosed thrust system. With even-numbered thrust systems, the internal helical vanes of one thrust pipe can be spiraled in the opposite direction from that of a second thrust pipe in order to self-compensate for stable flight.

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. A self-regulating pressure pipe for increasing a rate of a fluid flow of a fluid and configured to respond to the volume of the fluid or the viscosity of the fluid by decreasing or increasing the pressure within the self-regulating pressure pipe, the pipe having a cylindrical inner wall forming an axially positioned central passageway having an upstream portion and a downstream portion for the fluid flow through the central passageway, the self-regulating pressure pipe comprising:
a first plurality of spaced, arcuate vanes of substantially constant width disposed within the pipe and having a first end and a second end, the first end fixedly attached to the inner wall of the self-regulating pressure pipe, and the second end free and spaced inwardly from the first end, the arcuate vanes projecting inwardly from the interior wall and formed into a first helical spiral, the curvature of the arcuate vanes being substantially the same as the curvature of the inner wall, the arcuate vanes configured to impart a swirling tangential component to the fluid flow such that a vortex having a low pressure bore forms in the center of the central passageway, thereby increasing an axial velocity of the fluid flow as the fluid moves through the bore of the central passageway from the upstream portion to the downstream portion, with the proviso that there is no component that impedes or restricts the fluid flow through the central passageway, the low pressure bore having the capability of expanding or contracting in response to the volume of fluid or the viscosity of the fluid flowing through the central passageway, thereby decreasing or increasing the pressure within the self-regulating pressure pipe.

2. The self-regulating pressure pipe of claim 1, wherein n is the first number of the first plurality of spaced, arcuate vanes, and the second ends of the first plurality of spaced, arcuate vanes formed into the first helical spiral are positioned at an upstream end of the first helical spiral in a configuration wherein the second ends are positioned substantially 360 degrees/n from each other.

3. The self-regulating pressure pipe of claim 2, wherein n is an even number.

4. The self-regulating pressure pipe of claim 3, wherein n is chosen from the group consisting of 4, 6, 8, 10, 12, and 14.

5. The self-regulating pressure pipe of claim 1, further comprising a second plurality of spaced, arcuate vanes of substantially constant width disposed within the pipe downstream of the first plurality of spaced, arcuate vanes and in a configuration substantially similar to the first plurality of spaced, arcuate vanes.

6. The self-regulating pressure pipe of claim 5, wherein the second plurality of spaced, arcuate vanes are disposed within a portion of the cylindrical inner wall that comprises a perforated material, and an outer surface of the perforated material is at least partially covered by a solid exterior wall.

7. The self-regulating pressure pipe of claim 6, wherein the outlet of the central passageway is flanged.

8. The self-regulating pressure pipe of claim 6, wherein the portion of the cylindrical inner wall comprises at least two layers of perforated material.

9. The self-regulating pressure pipe of claim 8, wherein the perforated material in the at least two layers of perforated material includes triangular-shaped perforations, and the triangular-shaped perforations in one layer of the at least two layers of perforated material are not substantially aligned with the triangular-shaped perforations in a second layer of the at least two layers of perforated material.

10. The self-regulating pressure pipe of claim 1, wherein the upstream portion of the central passageway comprises and inlet and the downstream portion of the central passageway comprises an outlet and the fluid flow through the central passageway is substantially from the inlet to the outlet.

11. The self-regulating pressure pipe of claim 10, further comprising a second plurality of spaced, arcuate vanes of substantially constant width disposed within the pipe downstream of the first plurality of spaced, arcuate vanes, the second plurality of spaced, arcuate vanes having a first end and a second end, the first end fixedly attached to the inner wall of the self-regulating pressure pipe, and the second end free and spaced inwardly from the first end, the vanes projecting inwardly from the inner wall and formed into a second helical spiral, the curvature of the second plurality of spaced, arcuate vanes being substantially the same as the curvature of the inner wall, the second plurality of spaced, arcuate vanes configured to impart a swirling tangential component to the fluid flow such that the vortex having a low pressure bore continues in the center of the central passageway, thereby increasing the axial velocity of the fluid flow as the fluid moves through the bore of the central passageway from the upstream portion to the downstream portion, with the proviso that there is no component that impedes or restricts the fluid flow through the central passageway,
the low pressure bore having the capability of expanding or contracting in response to the volume of fluid or the viscosity of the fluid flowing through the central passageway, thereby decreasing or increasing the pressure within the self-regulating pressure pipe, and
wherein the second ends of the second plurality of spaced, arcuate vanes at the upstream end of the second helical spiral are not aligned with the second ends of the first helical spiral at the upstream end of the first helical spiral.

12. The self-regulating pressure pipe of claim 11, wherein the outlet of the central passageway is flanged.

13. The self-regulating pressure pipe of claim 10, wherein the outlet of the central passageway is flanged.

14. The self-regulating pressure pipe of claim 1, wherein the fluid is chosen from a gas, a liquid, and a two phase mixture of a gas and a liquid.

15. The self-regulating pressure pipe of claim 1, wherein the first plurality of spaced, arcuate vanes are disposed within a portion of the cylindrical inner wall that is dimpled.

16. The self-regulating pressure pipe of claim 1, wherein the pipe is formed into a loop configured to allow the fluid to re-circulate, further comprising:
   a second plurality of spaced, arcuate vanes of substantially constant width disposed within the pipe downstream of the first plurality of spaced, arcuate vanes and in a configuration substantially similar to the first plurality of spaced, arcuate vanes,
   the first plurality of spaced, arcuate vanes and the second plurality of spaced, arcuate vanes disposed within a first portion and a second portion, respectively, of the cylindrical inner wall that comprises a perforated material;
   a solid exterior wall covering at least a portion of an outer surface of the perforated material; and
   at least one collection pipe inserted through the solid exterior wall.

17. A method of increasing thrust of a device chosen from a rocket, a jet, and a missile by using a self-regulating pressure pipe according to claim 1 to increase the axial velocity of a fluid flow in a thruster attached to or incorporated in the body of the device.

18. A method of transporting a fluid comprising:
   providing a self-regulating pressure pipe for increasing a rate of a fluid flow of a fluid and configured to respond to the volume of the fluid or the viscosity of the fluid by decreasing or increasing the pressure within the self-regulating pressure pipe, the pipe having a cylindrical inner wall forming an axially positioned central passageway having an upstream portion and a downstream portion for the fluid flow through the central passageway, the self-regulating pressure pipe comprising:
   a first plurality of spaced, arcuate vanes of substantially constant width disposed within the pipe and having a first end and a second end, the first end fixedly attached to the inner wall of the self-regulating pressure pipe, and the second end free and spaced inwardly from the first end, the arcuate vanes projecting inwardly from the interior wall and formed into a first helical spiral, the curvature of the arcuate vanes being substantially the same as the curvature of the inner wall, the arcuate vanes configured to impart a swirling tangential component to the fluid flow such that a vortex having a low pressure bore forms in the center of the central passageway, thereby increasing an axial velocity of the fluid flow as the fluid moves through the bore of the central passageway from the upstream portion to the downstream portion, with the proviso that there is no component that impedes or restricts the fluid flow through the central passageway, the low pressure bore having the capability of expanding or contracting in response to the volume of fluid or the viscosity of the fluid flowing through the central passageway, thereby decreasing or increasing the pressure within the self-regulating pressure pipe;
   adding or injecting the fluid into the upstream portion of the central passageway; and
   allowing the fluid to flow through the central passageway, forming a vortex having a low pressure bore in the center of the central passageway, thereby increasing an axial velocity of the fluid flow as the fluid moves through the bore of the central passageway from the upstream portion to the downstream portion, thereby increasing the axial velocity of the fluid and transporting the fluid through the self-regulating pressure pipe.

19. The method of claim 18, wherein the fluid is oil.

20. The method of claim 18, wherein the fluid is water, and further comprising:
   supplying the water having increased axial velocity to a turbine operationally connected to a generator; and
   allowing the generator to generate hydroelectric power.

21. The method of claim 18, wherein the fluid is a mixture of components comprising at least one of a solid, a liquid, and a gas, and the self-regulating pressure pipe comprises a second plurality of spaced, arcuate vanes disposed within a portion of the cylindrical inner wall that comprises a perforated material, and an outer surface of the perforated material is at least partially covered by a solid exterior wall; and
   allowing centripetal force associated with the swirling tangential component imparted to the fluid flow by the arcuate vanes to separate out at least one component of the mixture according to its specific gravity and to force the at least one component through the perforated material, thereby separating the component from the fluid mixture.

* * * * *